(12) United States Patent
Henderson et al.

(10) Patent No.: US 12,370,597 B2
(45) Date of Patent: Jul. 29, 2025

(54) MOLTEN METAL FILTRATION BOX HEATING APPARATUS

(71) Applicant: PYROTEK, INC., Spokane, WA (US)

(72) Inventors: Richard S. Henderson, Solon, OH (US); Mike Tomassi, East Syracuse, NY (US); Mark Reynolds, Fergus (CA)

(73) Assignee: PYROTEK, INC., Spokane, WA (US)

( * ) Notice: Subject to any disclaimer, the term of this patent is extended or adjusted under 35 U.S.C. 154(b) by 800 days.

(21) Appl. No.: 17/431,337

(22) PCT Filed: Feb. 14, 2020

(86) PCT No.: PCT/US2020/018238
§ 371 (c)(1),
(2) Date: Aug. 16, 2021

(87) PCT Pub. No.: WO2020/168161
PCT Pub. Date: Aug. 20, 2020

(65) Prior Publication Data
US 2022/0134415 A1    May 5, 2022

Related U.S. Application Data

(60) Provisional application No. 62/806,057, filed on Feb. 15, 2019.

(51) Int. Cl.
| | |
|---|---|
| *B22C 9/08* | (2006.01) |
| *B01D 29/15* | (2006.01) |
| *B01D 35/18* | (2006.01) |
| *B22D 11/119* | (2006.01) |
| *F27B 14/08* | (2006.01) |

(52) U.S. Cl.
CPC ............. *B22C 9/086* (2013.01); *B01D 29/15* (2013.01); *B01D 35/18* (2013.01); *B22D 11/119* (2013.01); *F27B 14/08* (2013.01)

(58) Field of Classification Search
CPC ........ B22C 9/086; B01D 29/15; B01D 35/18; B22D 11/119; F27B 14/08
See application file for complete search history.

(56) References Cited

FOREIGN PATENT DOCUMENTS

| | | | |
|---|---|---|---|
| JP | H05140660 A | * | 6/1993 |
| JP | H06136462 A | * | 5/1994 |
| JP | H06228670 A | * | 8/1994 |
| JP | 2005140660 A | | 6/2005 |
| JP | 2006228670 A | | 8/2006 |
| JP | 2007216465 A | | 8/2007 |
| KR | 20140031843 A | * | 3/2014 |
| WO | 2006109593 A1 | | 10/2006 |

OTHER PUBLICATIONS

International Search Report for PCT Application No. PCT/US2020/018238, dated Jun. 23, 2020, 3 pages.

* cited by examiner

*Primary Examiner* — Waqaas Ali
(74) *Attorney, Agent, or Firm* — Lippes Mathias LLP

(57) ABSTRACT

A molten metal filtration apparatus is provided. The apparatus includes a filter chamber having a floor, a metal inlet, a metal outlet, and a wall surface adapted to be partitioned by at least one filter element having an open cell structure characterized by a plurality of interconnected voids. The filter element partitions the filter chamber. At least one heater device is provided at an elevation within the filtration chamber that is equal to or below the filter element.

15 Claims, 4 Drawing Sheets

MOLTEN METAL FILTRATION BOX HEATING APPARATUS

This application claims the benefit of U.S. Provisional Application No. 62/806,057 filed Feb. 15, 2019, the disclosure of which is herein incorporated by reference.

BACKGROUND

The present disclosure relates generally to the field of filtering impurities from molten metal. In particular, this disclosure relates to a unique design of a molten metal filter box. However, it is to be appreciated that the present exemplary embodiment is also amenable to other similar molten metal filtration systems.

In the melting, refining and forming of metals, especially the casting of molten metals, it is desirable to separate inclusions from the molten metal. Such inclusions result from impurities present in the raw materials used to form the melt, from slag, dross and oxides which form on the surface of the melt, and from small fragments of the refractory material used to form the chamber or vessel in which the molten metal melt is formed. Such inclusions, if not removed from the molten state of the metal, can result in weakened areas and/or porosity in the finally solidified metal body—the end product of the casting operation.

Typically, in a metal casting operation, the metal melt is formed and sometimes alloyed or otherwise refined in a furnace wherein the constituent components are added in the form of unmelted scrap and/or refined virgin metal. Low density solids tend to migrate to the surface of the melt where they either effervesce or float in combination with partially and completely solidified oxides known variously as slag and dross. These floating impurities can often be scraped from the melt's surface. However, higher and similar density impurities tend to remain in some degree of suspension in the liquid melt and cannot be scraped or otherwise visually identified and selectively removed from the molten metal.

From a furnace, the molten metal is transferred to a forming step. Transport may be accomplished with a ladle or other device. Alternatively, the molten metal may be drawn directly from the furnace and flowed through a channeling means to a mold—a process which allows continuous casting.

During the transportation or conveyance of the molten metal, it is often desirable to ensure that any remaining dross or slag, from the surface of the melt, and entrained, exogenous intermetallic inclusions submerged in the melt are removed prior to the final solidification stage.

One method that is used to prevent the inclusion of exogenous intermetallic substances, including slag or dross, in the formed metal body is to filter the molten metal between the melting furnace and the forming stage. A variety of means for accomplishing this filtration step are well known to those with skill in the art. Filtering examples can be found in U.S. Pat. Nos. 4,964,993; 4,444,377; 4,426,287; 4,413,813; 4,384,888; 4,330,328; 4,330,327; 4,302,502; 4,298,187; 4,258,099; 4,179,102; 4,159,104; 4,081371; 4,032,124; 3,869,282; and, 5,126,047, which are herein incorporated by reference.

In such systems, a filter medium or filter element of a temperature resistant material is used. Preferred materials resist deterioration from melting, chemical reaction with the metal, and erosion at elevated temperatures. The filter medium must also maintain structural integrity at elevated temperatures and, of course, must either entrap or prevent the flow of solids and semi-liquids, by chemical reactions and/or by mechanical prevention of their flow therethrough.

Different filter designs are known to those skilled in the art. For example, U.S. Pat. No. 5,369,063, herein incorporated by reference, describes a foam filter of alumina which can be formed into a plate. U.S. Pat. No. 5,126,047 teaches a hollow rectangular prism in fluid communication with a refractory plate. Cartridge filters comprised of end plates interconnected by filtration tubes are also used in the art.

Cartridge filters are often considered superior filters because they possess exceptional throughput, filtration capabilities and longevity. The TKR division of Mitsui Kinzoku introduced a filtering system for molten aluminium called "Metalofilter" in 1972. The Metalofilter is illustrated in FIG. 1. The Metalofilter can be installed after a degassing unit (when provided) and before the casting unit. Inclusions or impure particles are captured at the surface or in the filter tubes of a cartridge filter. A exemplary cartridge filter is illustrated in FIG. 2. The filter tubes are usually installed in a cartridge with 7, 11, 18, 22, or 28 filter tubes.

The TKR Metalofilter includes a heating lid that incorporates a set of heaters or gas burners to preheat the box and/or maintain molten metal temperature. The present disclosure provides an improved filter box which provides improved filtering efficiencies.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

In accordance with one aspect of the disclosure, a molten metal filtration apparatus is provided. The apparatus includes a filter chamber having a floor, a metal inlet, a metal outlet, and a wall surface adapted to be partitioned by at least one filter element having an open cell structure characterized by a plurality of interconnected voids. The filter element partitions the filter chamber. At least one heater device is provided at an elevation within the filtration chamber that is equal to or below the filter element.

In accord with a further embodiment, a method of preheating and operating a molten metal filtration box is provided. The method includes the step of providing a molten metal filtration apparatus comprising a filter chamber having a floor, a metal inlet, a metal outlet, and a wall surface adapted to be partitioned by at least one cartridge filter. The cartridge filter has an open cell structure characterized by a plurality of interconnected voids. At least a first heater device is provided in a lid of the filtration box and at least a second heater device is provided at an elevation within the filtration chamber that is equal to or below the cartridge filter. The method includes the step of operating both heater devices for at least a period of preheating and operating only the second heater devices during a casting cycle.

According to another embodiment, a molten metal filtration apparatus is provided. The apparatus includes a filter chamber having a floor, a metal inlet, a metal outlet, and a wall surface adapted to be partitioned by a plurality of filter elements. The filter elements comprise filter tubes dispersed between end plates. The filter tubes have an open cell structure characterized by a plurality of interconnected voids. The filter tubes are disposed in at least two rows and at least two columns. The rows and columns define an open space with at least one heater device positioned within the open space.

BRIEF DESCRIPTION OF THE DRAWINGS

The following description and drawings set forth certain illustrative implementations of the disclosure in detail. The illustrated examples, however, are not exhaustive of the many possible embodiments of the disclosure.

DETAILED DESCRIPTION

Figure 1:
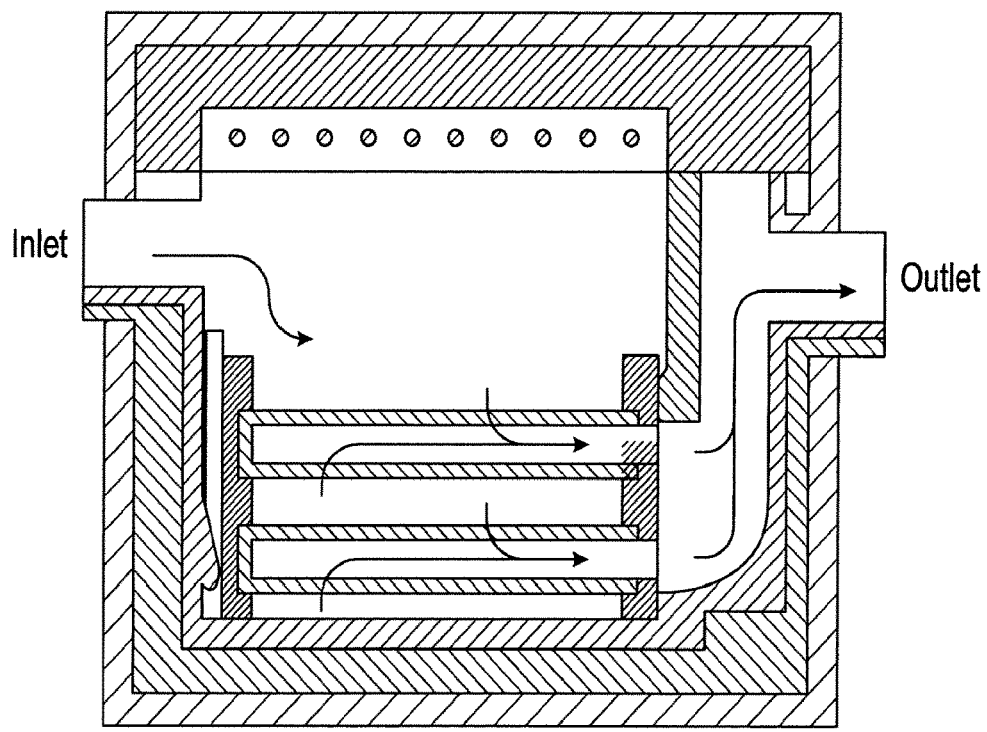
FIG. 1 is a cross-sectioned view of a prior art filter box.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms about, generally and substantially are intended to encompass structural or numerical modifications which do not significantly affect the purpose of the element or number modified by such term.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Figure 2:
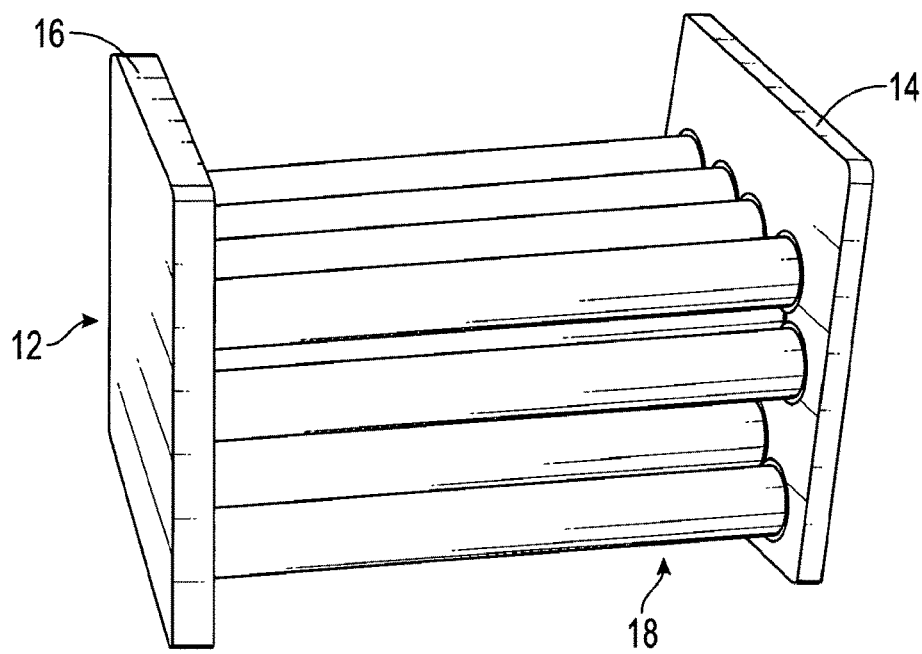
FIG. 2 is perspective view of a prior art cartridge filter.

Referring now to FIG. 2, a representative cartridge filter 12 is depicted. Plates 14 and 16 receive a plurality of filter tubes 18. A first end of the tubes can be open and mate with passages in plate 16 while a second end of the tubes can be closed and housed in plate 14 (see FIG. 1 illustration). Molten metal flows through the filter tubes and the passages in plate 16 to an outlet of the filter box. The cartridge filter 12 can be lifted by a forklift or hydraulic positioning equipment, for example, and inserted or removed from a filter box of the types illustrated in FIGS. 3-8.

At least portions of the outward facing surface of the open plate 16 can be covered by a expandable gasket material, for example, Vermiculite available from 3M, which is used to securely seal open plate 16 to the filter box wall and prevent leakage of molten metal.

The porous, ceramic material of the filter tubes 18 can be refractory bonded silicon carbide available from the Metaullics Systems Division of Pyrotek, Inc. and the material of the plates 14 and 16 can be refractory bonded silicon carbide available from Pyrotek, Inc.

Cartridge filter equipped filtration boxes are most typically used in a continuous casting process. An exemplary cast operation would process about 50 metric tons of molten metal at a rate of 1600 lbs/min. Due to the requirement to reset the casting pit, there can be 60 or more holds during a cast operating process (i.e., before the furnace is depleted and recycled to a new molten metal batch).

The filter tubes and the molten metal within the box during a casting cycle hold must be maintained at elevated temperatures. As demonstrated by FIG. 1, heating elements have historically been placed in the lid of the filtration box to achieve this result.

The present inventors have discovered this to be problematic with respect to processing magnesium containing alloys such as 3,000 and 5,000 series alloys (particularly 5,000 series). Moreover, the higher the temperature and the longer the hold time the more $MgO_{(x)}$ is formed. These oxides serve to shorten the life of the filter tubes. For example, when processing 5,000 series alloys, the life of a cartridge filter may be shortened to 17 metric tons. The present inventors have discovered that this problem is exacerbated when the atmosphere above the molten metal in the filter box is the hottest zone in the unit as a result of using lid heaters exclusively.

Another shortcoming of existing filtration soy designs is associated with the requirement preheat the filter tubes to effectively process the molten metal. Moreover, the tubes should be at 800° C. or higher to function properly. The preheating process can take in excess of 15 hours. However, the present inventors have learned that heating of the entire depth of filter tubes using box lid can lead to uneven temperature exposure. Moreover, filter tubes closer to the lid heating elements will be exposed to a higher temperature than 800° C. (for example) to allow the lower rows of tubes to achieve 800° C. Exposing the top rows of tubes to higher heating temperatures can damage the exposed filter tubes. Moreover, overheating can cause binder failure and/or tube defects.

Figure 3:
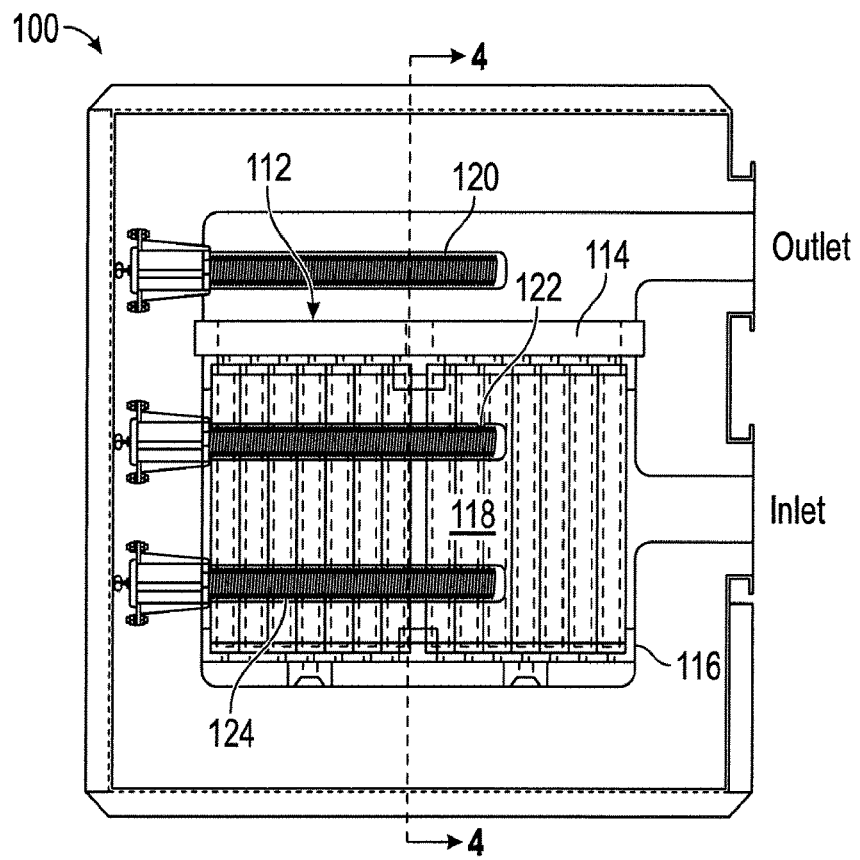
FIG. 3 is a top plan view (partially in phantom) of a filtration apparatus in accord with the present disclosure.
Figure 4:
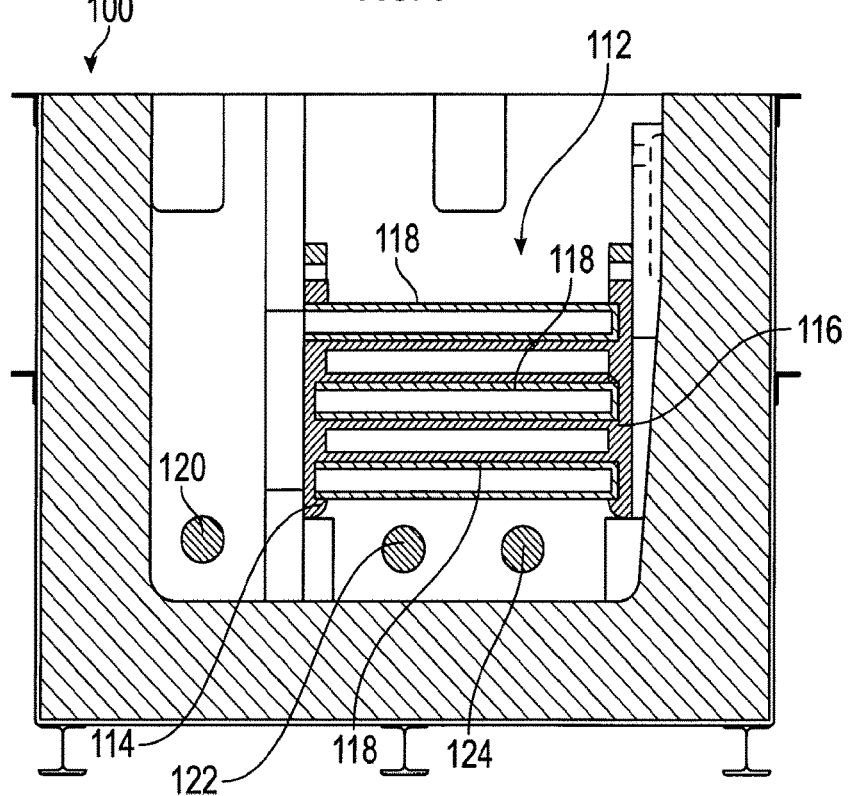
FIG. 4 is a cross-sectional view of the apparatus of FIG. 3 taken along line A-A.

Referring now to FIGS. 3 and 4, a first embodiment of the present disclosure is illustrated. Filter box 100 includes cartridge filter 112 having end plates 114 and 116 with a plurality of filter tubes 118 disposed therebetween in rows and columns. Immersion heaters 120, 122 and 124 are provided below cartridge filter 112. Glowbar immersion heaters suitable for use in molten metal are available from Tounetsu Co., Ltd. Additional heaters can be located in the filter box lid in the same manner as illustrated in FIG. 1.

The addition of the immerson heaters below the intended melt line advantageously avoids over-heating certain filter tubes during pre-heating, allows preheating to be performed at a faster pace, provides a more consistent temperature throughout the box when metal filled, avoids overheating the atmosphere above the molten metal where unwanted oxides are most likely to form, and saves energy by introducing heat into highly thermally conductive metal rather than a gas atmosphere.

The present design further allows greater flexibility in heating profiles. For example, if present, the lid heaters can be used in combination with the heaters below the intended melt line during preheat and/or during a casting cycle hold, but otherwise shut-off. Similarly, it is contemplated that the lid heaters and the heaters below the melt liner will be operated at any point in time of the casting process, but below the melt liner heaters can be operated at a higher temperature.

Figure 5:
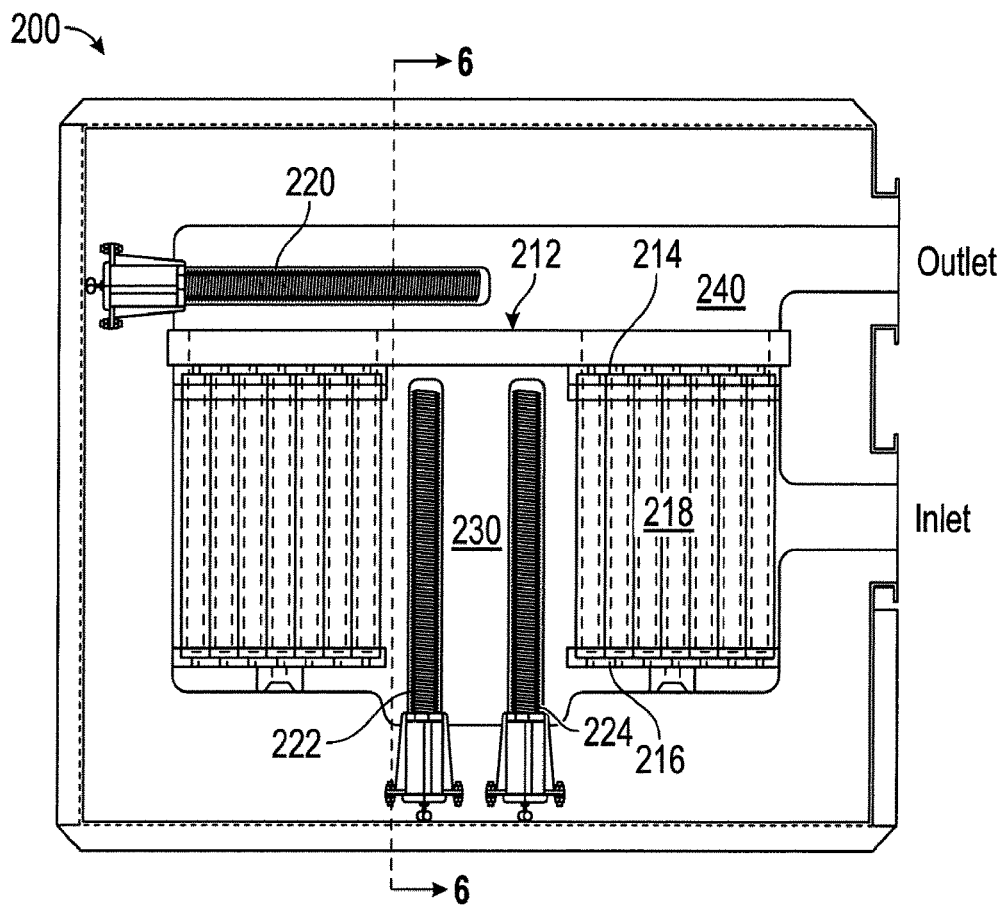
FIG. 5 is a top plan view (partially in phantom) of an alternative filtration apparatus embodiment in accord with the present disclosure.
Figure 6:
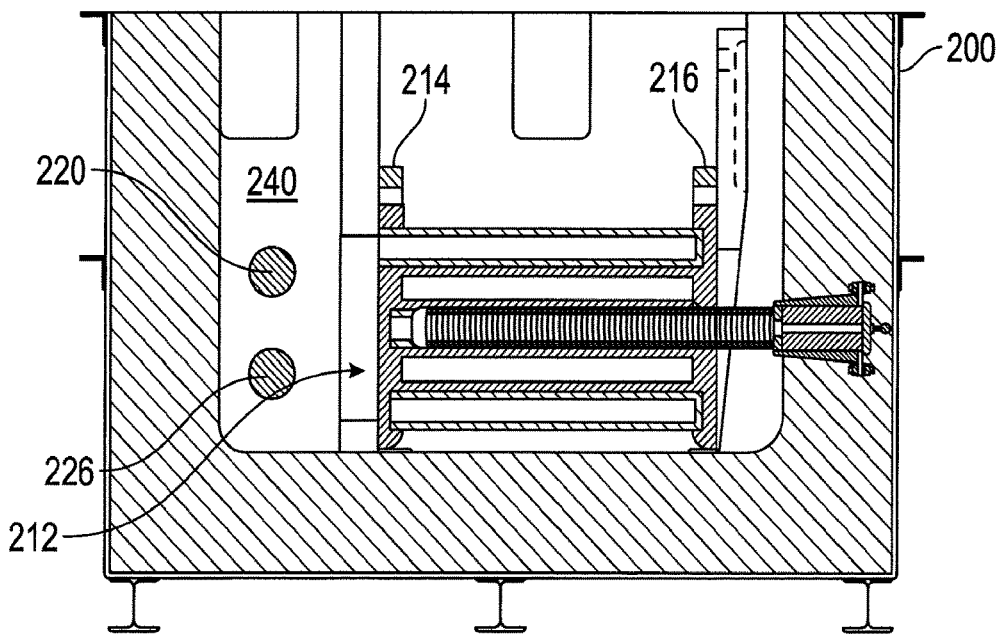
FIG. 6 is a cross-sectional view of the apparatus of FIG. 5 taken along line A-A.

Referring now to FIGS. 5 and 6, a second embodiment of the present disclosure is illustrated. Filter box 200 includes cartridge filter 212 having end plates 214 and 216 with a plurality of filter tubes 218 disposed therebetween in rows and columns. Immersion heaters 220, 222, 224 and 226 are provided at the same elevation as cartridge filter 212. Moreover, in this embodiment, the cartridge filter 212 is provided with a tube gap 230 to receive heaters 222 and 224. Heaters 220 and 226 are vertically aligned and positioned perpendicular to heaters 220 and 224 in the filter box outlet channel 240. This configuration maximizes available space and places the heaters in an effective zone adjacent the cartridge filter and submerged in the molten metal during the casting cycle. Additional heaters can be located in the filter box lid in the same manner as illustrated in FIG. 1.

Figure 7:
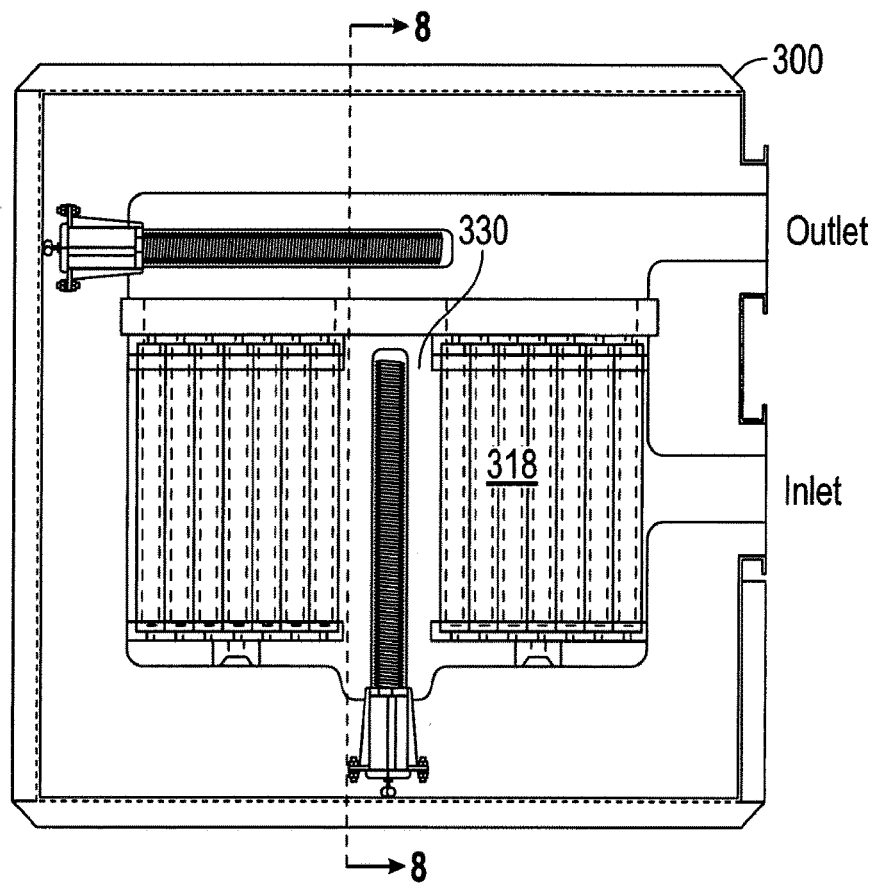
FIG. 7 is a top plan view (partially in phantom) of a further alternative filtration apparatus embodiment in accord with the present disclosure.
Figure 8:
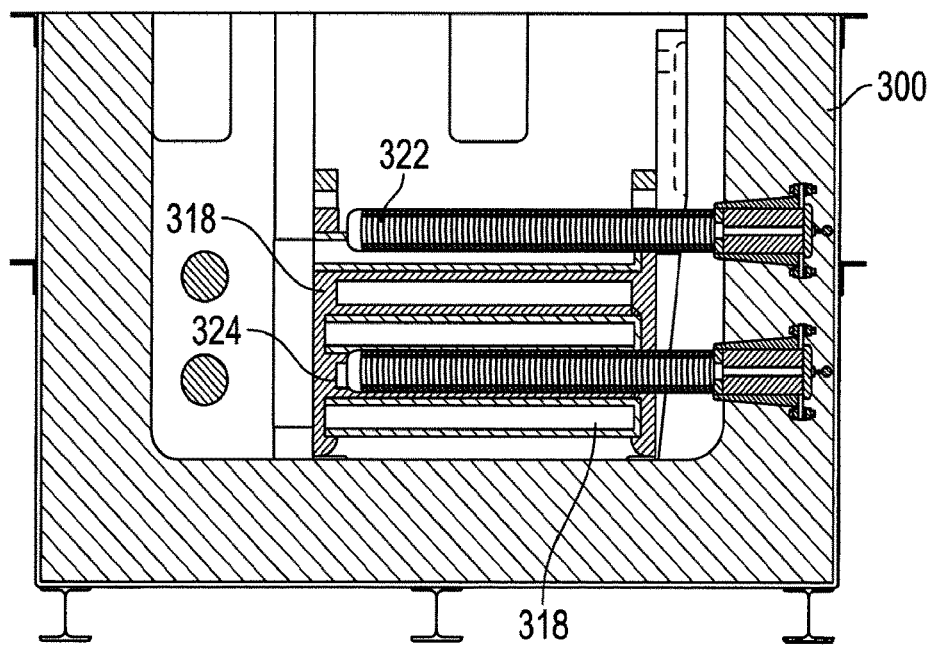
FIG. 8 is a cross-sectional view of the apparatus of FIG. 2 taken along line A-A.

Referring now to FIGS. 7 and 8, a third embodiment of the disclosure is illustrated. This configuration is similar to the second embodiment but in this instance the gap 330 between the filter tubes 318 has been narrowed and immersion heaters 322 and 324 are vertically stacked. This demonstrates that a number of configurations are available to best position the heater devices in effective locations in and around the cartridge filter tubes.

While the present disclosure illustrates a filter box including a cartridge filter, it is contemplated that the positioning of the heater elements adjacent and below the filter body may also have advantageous use with other filter designs such as plate or rectangular prism filters.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A molten metal filtration apparatus comprising a filter chamber having a floor, a metal inlet, a metal outlet, and a wall surface adapted to be partitioned by at least one filter element, said filter element having an open cell structure characterized by a plurality of interconnected voids, wherein the filter element partitions the filter chamber; and wherein at least one heater device is provided at an elevation within the filtration chamber that is equal to or below the filter element, and wherein at least one heater device is located in an outlet channel of the apparatus at an elevation below at least one filter element wherein the at least one heater device is positioned in a outlet channel of the apparatus at an elevation below the at least one filter element over an entire length of the at least one heater device.

2. The apparatus of claim 1 further comprising at least two heater devices at elevation equal to or below the filter element.

3. The apparatus of claim 2 further comprising a heater device located above the filter element.

4. The apparatus of claim 3, wherein the further heater device is located in a lid.

5. The apparatus of claim 2, wherein the heater devices have a longitudinal axis and wherein the longitudinal axes of the two heater devices are perpendicular.

6. The apparatus of claim 2, wherein at least two heater devices are positioned at different elevations.

7. The apparatus of claim 6, wherein one heater device is positioned below an elevation of the filter element and at least one heater device is positioned in the same elevation plane as a portion of the filter element.

8. The apparatus of claim 2 being comprised of at least three heater devices.

9. The apparatus of claim 1, wherein the filter element comprises a cartridge filter.

10. A molten metal filtration apparatus comprising a filter chamber having a floor, a metal inlet, a metal outlet, and a wall surface adapted to be partitioned by a plurality of filter elements, said filter elements comprising filter tubes dispersed between end plates, said filter tubes having an open cell structure characterized by a plurality of interconnected voids, wherein the filter elements are oriented parallel and partition the filter chamber, said filter tubes being disposed in at least two rows and at least two columns, said rows and columns defining an open space, and wherein at least one heater device is positioned within said open space, and wherein at least one heater device is positioned in an outlet channel of the apparatus at an elevation below at least one of said filter elements wherein the at least one heater device is positioned in a outlet channel of the apparatus at an elevation below the at least one filter element over an entire length of the at least one heater device.

11. The apparatus of claim 10, wherein said open space extends from a lid of the apparatus to said floor.

12. The apparatus of claim 10, wherein said heater device comprises an elongated body oriented parallel to a longitudinal axes of the filter elements.

13. The apparatus of claim 12, comprising at least two heater devices positioned within said open space.

14. The apparatus of claim 13, wherein said heater devices are parallel and horizontally aligned.

15. The apparatus of claim 13, wherein said heater devices are parallel and vertically aligned.

* * * * *